(12) United States Patent
Maginnis et al.

(10) Patent No.: US 7,360,448 B2
(45) Date of Patent: Apr. 22, 2008

(54) ULTRASONIC FLOW SENSOR HAVING REFLECTING INTERFACE

(75) Inventors: Thomas Owen Maginnis, Anaheim, CA (US); Kim Ngoc Vu, Yorba Linda, CA (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 11/502,308

(22) Filed: Aug. 10, 2006

(65) Prior Publication Data

US 2007/0034016 A1 Feb. 15, 2007

Related U.S. Application Data

(60) Provisional application No. 60/707,574, filed on Aug. 12, 2005.

(51) Int. Cl.
*G01F 1/66* (2006.01)
(52) U.S. Cl. ............................................. 73/861.27
(58) Field of Classification Search . 73/861.25–861.31
See application file for complete search history.

(56) References Cited

U.S. PATENT DOCUMENTS

| | | | |
|---|---|---|---|
| 3,357,243 A | 12/1967 | Woodcock | |
| 3,575,050 A | 4/1971 | Lynnworth | |
| 3,851,526 A | 12/1974 | Drexel | |
| 3,987,674 A | 10/1976 | Baumoel | |
| 4,003,252 A | 1/1977 | Dewath | |
| 4,164,865 A | 8/1979 | Hall et al. | |
| 4,286,470 A | 9/1981 | Lynnworth | |

(Continued)

FOREIGN PATENT DOCUMENTS

JP         2003015738         1/2003

| | | | |
|---|---|---|---|
| JP | 2005-188974 A | * | 7/2005 |
| WO | WO 2005/061997 A1 | | 12/2003 |
| WO | WO 2004/010086 A2 | | 1/2004 |
| WO | WO 2004/010474 A2 | | 1/2004 |
| WO | WO 2005061997 A1 | * | 7/2005 |

OTHER PUBLICATIONS

Hiroaki Ishikawa, Masaki Takamoto, Kazuyoshi Suimizu, Hideaki Monji, Goichi Matsui, Sensor Configuration and Flow Rate Characteristics of Ultrasonic Flowmeter for Very Low Liquids Flow Rate, Transactions of the Society of Instrument and Control Engineers, vol. 36, No. 12, pp. 1071-1078 (2000).

Ron Chiarello, Eric Boyd, Chris Wacinski, Chris Schutte, Jerry Elkind, Nelson Urdaneta, Roxanne Holtz and Joseph Foster, Point-of-Use Liquid Chemical Sensors for Process Tools, Semi® Technical Symposium: Innovations in Semiconductor Manufacturing (STS:ISM), Presented Jul. 13, 2004.

(Continued)

*Primary Examiner*—Harshad Patel
(74) *Attorney, Agent, or Firm*—Lowrie, Lando & Anastasi, LLP.

(57) ABSTRACT

An ultrasonic flow sensor that includes a conduit having a length, a first ultrasonic transducer disposed at a first position along the length of the conduit, a second ultrasonic transducer disposed at a second position along the length of the conduit, the second position being spaced apart from the first position, a first reflecting interface and a second reflecting interface. The first reflecting interface is in registration with the first ultrasonic transducer to receive first acoustic energy from the first ultrasonic transducer and to reflect the first acoustic energy in a direction generally along a length of the conduit and into a fluid within the conduit. The second reflecting interface is in registration with the second ultrasonic transducer to receive second acoustic energy from the second ultrasonic transducer and to reflect the second acoustic energy in a direction generally along the length of the conduit and into the fluid within the conduit.

57 Claims, 4 Drawing Sheets

U.S. PATENT DOCUMENTS

| | | | |
|---|---|---|---|
| 4,787,252 A | 11/1988 | Jacobson et al. | |
| 5,001,936 A | 3/1991 | Baumoel | |
| 5,052,230 A * | 10/1991 | Lang et al. | 73/861.28 |
| 5,131,278 A | 7/1992 | Baumoel | |
| 5,594,181 A | 1/1997 | Stange | |
| 5,669,408 A | 9/1997 | Nishino et al. | |
| 5,672,832 A | 9/1997 | Cucci et al. | |
| 5,717,145 A | 2/1998 | Yasuhara et al. | |
| 5,791,369 A | 8/1998 | Nishino et al. | |
| 5,792,965 A | 8/1998 | Bignell | |
| 5,816,285 A | 10/1998 | Ohmi et al. | |
| 5,818,735 A | 10/1998 | Tigwell et al. | |
| 5,861,546 A | 1/1999 | Sagi et al. | |
| 5,868,159 A | 2/1999 | Loan et al. | |
| 5,911,238 A | 6/1999 | Bump et al. | |
| 5,974,897 A | 11/1999 | Koyano et al. | |
| 6,055,868 A * | 5/2000 | Koyano et al. | 73/861.28 |
| 6,152,162 A | 11/2000 | Balazy et al. | |
| 6,152,168 A | 11/2000 | Ohmi et al. | |
| 6,305,233 B1 | 10/2001 | Braathen et al. | |
| 6,431,950 B1 | 8/2002 | Mayes | |
| 6,490,933 B2 * | 12/2002 | Koyano et al. | 73/861.27 |
| 6,578,435 B2 | 6/2003 | Gould et al. | |
| 6,612,175 B1 | 9/2003 | Peterson et al. | |
| 6,622,572 B2 | 9/2003 | Kobayashi et al. | |
| 6,644,130 B2 * | 11/2003 | Imai et al. | 73/861.27 |
| 6,647,805 B2 | 11/2003 | Kobayashi et al. | |
| 6,668,664 B1 * | 12/2003 | Ohkawa | 73/861.27 |
| 6,681,642 B2 * | 1/2004 | Ohkawa | 73/861.27 |
| 6,684,112 B1 | 1/2004 | Cheng | |
| 6,685,668 B1 | 2/2004 | Cho et al. | |
| 6,758,102 B2 | 7/2004 | Henry et al. | |
| 6,782,326 B2 | 8/2004 | Takamoto et al. | |
| 6,877,387 B1 | 4/2005 | Certon et al. | |
| 6,978,683 B2 * | 12/2005 | Imai et al. | 73/861.27 |
| 7,024,944 B2 * | 4/2006 | Imai et al. | 73/861.27 |
| 2001/0010031 A1 | 7/2001 | Takamoto et al. | |
| 2003/0097882 A1 | 5/2003 | Schlosser et al. | |
| 2003/0115969 A1 | 6/2003 | Koyano et al. | |
| 2003/0189060 A1 | 10/2003 | Osterheld et al. | |
| 2003/0209083 A1 | 11/2003 | Nakabayashi et al. | |
| 2004/0030509 A1 | 2/2004 | Plong-Soerensen et al. | |
| 2004/0050176 A1 | 3/2004 | Ohnishi | |
| 2006/0243065 A1 * | 11/2006 | Sakai et al. | 73/861.26 |
| 2007/0034016 A1 * | 2/2007 | Maginnis et al. | 73/861.28 |
| 2007/0151361 A1 * | 7/2007 | Kamimura | 73/861.27 |

OTHER PUBLICATIONS

Volker, Hans and Volker, Skwarek, "Model About The Working-Principle Of The Ultrasonic Cross Correlation Flowmeter".

Grennberg, Anders and Sandell, Magnus, "Estimation of Subsample Time Delay Differences in Narrowband Ultrasonic Echoes Using the Hilbert Transform Correlation," Transactions on Ultrasonics, Ferroelectrics and Frequency Control, vol. 41, No. 5, pp. 588-595, Sep. 1994.

Fukuhara, Satoshi, Kataoka Akira, Ukezono Nobuhiro, Sekiguch, Toshio, US350 Ultrasonic Flowmeter, vol. 48, No. 1, pp. 29-32, (2004).

Pan et al., "Experimental and numerical investigations of axisymmetric wave propagation in cylindrical pipe filled with fluid," J. Acoust. Soc. Am. 113(6), pp. 3209-3214, Jun. 2003.

"Measurement of fluid in closed conduits—Methods using transit-time ultrasonic flowmeters," Technical Report, ISO/TR 127651998(E).

Maginnis, Thomas O., Ray Modeling and Error Leverage Factors For A General Clamp-On Ultrasonic Flowmeter, Measurement Science Conference, Anaheim, CA, lecture presented Jan. 20, 2005.

Maginnis, Thomas O., Ray Modeling and Error Leverage Factors For A General Clamp-On Ultrasonic Flowmeter, Measurement Science Conference, Anaheim, CA, supporting slides presented Jan. 20, 2005.

International Search Report and Written Opinion for PCT/US2006/031291 mailed Jan. 29, 2007.

* cited by examiner

ULTRASONIC FLOW SENSOR HAVING REFLECTING INTERFACE

BACKGROUND

1. Field of Invention

The present invention relates to ultrasonic flow measurement and more particularly to an improved ultrasonic flow sensor that may be used alone or as part of a flow controller.

2. Discussion of Related Art

Ultrasonic flow sensing is often employed where a non-invasive approach to sensing fluid flow in a conduit is desired. Typical applications for flow sensors include, for example, the manufacture and/or processing of semiconductors.

Traditionally, a pair of ultrasonic transducers is employed where an upstream ultrasonic transducer transmits ultrasonic waves that are received by a downstream ultrasonic transducer, and the downstream ultrasonic transducer transmits ultrasonic waves that are received by the upstream ultrasonic transducer. The difference between the time of flight of the upstream ultrasonic wave and the time of flight of the downstream ultrasonic wave is determined and the velocity of the fluid flowing in the conduit may be calculated from the difference. Based upon the velocity of the fluid and other physical properties of the conduit and the fluid, the volume flow rate of the fluid may be determined.

Examples of ultrasonic flow sensors and controllers are described, for example, in U.S. Pat. Nos. 6,055,868, 5,974,897, and 3,575,050, and in commonly owned U.S. patent application Ser. No. 10/878,974, entitled "ULTRASONIC LIQUID FLOW CONTROLLER" (hereinafter "co-pending application") filed Jun. 28, 2004, which is hereby incorporated herein by reference in its entirety.

The co-pending application describes systems and signal processing techniques that may be used with any ultrasonic flow sensor wherein the determination of the fluid flow rate is based upon a difference in time between a first ultrasonic signal that is propagated along a sensor conduit in the direction of fluid flow and a second ultrasonic signal that is propagated along the sensor conduit in a direction that is opposite to the direction of fluid flow.

Although the technology described in the co-pending application provides many advantages over conventional ultrasonic flow measurement systems and signal processing techniques, reliably getting ultrasonic energy into and out of fluid flowing in an ultrasonic flow sensor continues to be a difficult problem. Further, it is often difficult to measure very small flow-induced upstream to downstream time differences, particularly at relatively low rates, such as, for example, between 5 and 50 mli/min (and consequently relatively small internal sensor conduit diameters). Still further, where the acoustic impedance of the material from which the sensor conduit is formed is relatively closely matched by the acoustic impedance of the fluid flowing therein, one typically cannot rely on the acoustic energy imparted to the fluid being internally reflected by the material of the sensor conduit. In many such systems, the material from which the sensor conduit is formed may strongly attenuate higher ultrasonic frequencies (e.g., those above 1 MHz), such that the acoustic wavelengths employed are comparable to the inner diameter of the sensor conduit.

SUMMARY OF INVENTION

Embodiments of the present invention are broadly directed to ultrasonic flow sensors used to determine the flow rate of a fluid where the acoustic wavelength of the ultrasonic signals is comparable to the inner diameter of a sensor conduit that carries the fluid, and where the acoustic impedance of the fluid and the material from which the sensor conduit is formed are relatively closely matched. Although embodiments of the present invention are primarily described herein as being applicable to ultrasonic flow sensors that determine the flow rate of a fluid based on the time difference between ultrasonic energy transmitted upstream and downstream between a pair of ultrasonic transducers that are spaced apart along a length of the sensor conduit, it should be appreciated the present invention is not so limited. In this regard, because embodiments of the present invention provide predictable and superior coupling between the ultrasonic energy transmitted by the transducers and coupled into the conduit and the fluid therein, aspects of the present invention may be used to measure the flow rate of a fluid based on other than time of flight (e.g., time differencing) techniques. For example, rather than determining the flow rate of the fluid by differences between upstream and downstream propagation times, the flow rate may be determined based upon changes in the phase of the transmitted and received ultrasonic signals. Moreover, although embodiments of the present invention are primarily directed to the use of longitudinal waves of ultrasonic energy directed into the conduit and the fluid, it should be appreciated that aspects of the present invention may also be used with shear waves of ultrasonic energy within the conduit material.

According to one embodiment of the present invention, a flow sensor is provided. The flow sensor comprises a conduit having a length, a first ultrasonic transducer disposed at a first position along the length of the conduit, a second ultrasonic transducer disposed at a second position along the length of the conduit, the second position being spaced apart from the first position, a first reflecting interface, and a second reflecting interface. The first reflecting interface is in registration with the first ultrasonic transducer to receive first acoustic energy from the first ultrasonic transducer and to reflect the first acoustic energy in a direction generally along a length of the conduit and into a fluid within the conduit. The second reflecting interface is in registration with the second ultrasonic transducer to receive second acoustic energy from the second ultrasonic transducer and to reflect the second acoustic energy in a direction generally along the length of the conduit and into the fluid within the conduit.

According to another embodiment, a flow sensor is provided comprising a conduit having a length, a first ultrasonic transducer disposed at a first position along the length of the conduit, a second ultrasonic transducer disposed at a second position along the length of the conduit, the second position being spaced apart from the first position, a first reflecting interface, and a second reflecting interface. The first reflecting interface is in registration with the first ultrasonic transducer to receive first acoustic energy from the first ultrasonic transducer and to reflect the first acoustic energy in a direction generally along a length of the conduit and into a fluid within the conduit. The second reflecting interface is in registration with the second ultrasonic transducer to receive the first acoustic energy reflected in the direction generally along the length of the conduit and to reflect the first acoustic energy toward the second ultrasonic transducer.

According to a further embodiment of the present invention, a flow sensor is provided. The flow sensor comprises a conduit having a length and a longitudinal axis extending in a direction along the length of the conduit, a first ultrasonic transducer having a pair of opposed flat faces and disposed at a first position along the length of the conduit, a second ultrasonic transducer having a pair of opposed flat faces and disposed at a second position along the length of the conduit, the second position being spaced apart from the first position, a first reflecting interface and a second reflecting interface. The first reflecting interface has a first surface in registration with one of the pair of opposed flat faces of the first ultrasonic transducer to receive first acoustic energy from the first ultrasonic transducer and a second surface formed at an acute angle relative to the first surface and the longitudinal axis of the conduit to reflect the first ultrasonic energy in a direction generally along the length of the conduit and into a fluid within the conduit. The second reflecting interface has a first surface to receive the first acoustic energy reflected generally along the length of the conduit and a second surface in registration with one of the pair of opposed flat faces of the second ultrasonic transducer to reflect the first acoustic energy received by the first surface of the second reflecting interface toward the second ultrasonic transducer, the first surface of the second reflecting interface being formed at an acute angle relative to the second surface of the second reflecting interface and the longitudinal axis of the conduit.

In accordance with yet another embodiment of the present invention, a method of measuring flow rate is provided. The method comprises generating longitudinal acoustic waves, reflecting the longitudinal acoustic waves into a conduit and a fluid within the conduit at a first position spaced along a length of the conduit, receiving the longitudinal acoustic waves reflected into the conduit and the fluid within the conduit at a second position that is spaced apart from the first position along the length of the conduit, and reflecting the received longitudinal waves toward an acoustic receiver.

In yet another embodiment, a flow sensor is provided. The flow sensor includes a conduit having a length and a longitudinal axis that extends parallel to the length, a first ultrasonic transducer disposed at a first position along the length of the conduit, the first ultrasonic transducer having a transducer face configured to receive and transmit acoustic energy along a first path segment, a second ultrasonic transducer disposed at a second position along the length of the conduit, the second ultrasonic transducer having a transducer face configured to receive and transmit acoustic energy along a second path segment, a first reflecting interface having a first reflecting surface positioned to reflect acoustic energy from a direction along one of the first path segment and a third path segment to a direction along the other of the first path segment and the third path segment, the third path segment extending from the first reflecting surface to the longitudinal axis, and a second reflecting interface having a second reflecting surface positioned to reflect acoustic energy from a direction along one of the second path segment and a fourth path segment to a direction along the other of the second path segment and the fourth path segment, the fourth path segment extending from the second reflecting surface to the longitudinal axis.

In the flow sensor, each of the first path segment and the second path segment may be substantially parallel to the longitudinal axis, and the third path segment may intersect the longitudinal axis at a first acute angle, and the fourth path segment may intersect the longitudinal axis at a second acute angle with the first acute angle being substantially equal to the second acute angle. The first ultrasonic transducer may be configured to transmit acoustic energy as a longitudinal acoustic wave toward the first reflecting surface and the second ultrasonic transducer may be configured to transmit acoustic energy as a longitudinal acoustic wave toward the second reflecting surface. The first reflecting interface and the second reflecting interface may be integrally formed with the conduit and from a same material as the conduit. The first reflecting interface and the second reflecting interface may be symmetric about the longitudinal axis. Each of the first reflecting surface and the second reflecting surface may be formed at an acute angle with respect to the longitudinal axis of the conduit. The first reflecting interface may have a flat face in registration with the transducer face of the first ultrasonic transducer, and the transducer face of the first reflecting interface may be perpendicular to the longitudinal axis of the conduit. The second reflecting interface may have a flat face in registration with the transducer face of the second ultrasonic transducer, and the flat face of the second reflecting interface may be perpendicular to the longitudinal axis of the conduit. A ratio of an outer diameter of the conduit relative to an inner diameter of the conduit may be approximately 2.

In another embodiment, a method of measuring flow rate of a fluid in a conduit is provided. The method includes acts of generating first acoustic waves that propagate along a first path segment, reflecting the first acoustic waves into the conduit and the fluid within the conduit at a first position spaced along a length of the conduit, receiving the first acoustic waves reflected into the conduit and the fluid within the conduit at a second position that is spaced apart from the first position along the length of the conduit, and reflecting the received waves toward an acoustic receiver along a second path segment.

In the method, the act of generating first acoustic waves may include generating longitudinal acoustic waves, and the act of reflecting may include reflecting the first acoustic waves toward the conduit such that the first acoustic waves are incident on an outer surface of the conduit at a predetermined angle relative to a longitudinal axis of the conduit. The act of reflecting may also include reflecting the first acoustic waves such that the first acoustic waves pass into an interior portion of the conduit and periodically reflect off a surface of the conduit and intersect the longitudinal axis of the conduit more than once prior to reception of the first acoustic waves. The first path segment may be substantially parallel to the second path segment. In the method the act of reflecting the waves into the conduit may include positioning a first reflecting surface at a first reflection angle relative to the first path segment, and the act of reflecting the received waves may include positioning a second reflecting surface at a second reflection angle relative to the first path segment with the first reflection angle being substantially equal to the second reflection angle. Each of the first reflecting surface and the second reflecting surface may have a conical shape and be integrally formed with the conduit and made from a same material as the conduit. The fluid may be a semiconductor polishing slurry, and the method may include determining a flow rate of the fluid in the conduit. In the method, the act of generating first acoustic waves may include generating shear acoustic waves including radially polarized shear acoustic waves that propagate within a material of the first reflecting interface and the second reflecting interface. The method may also include generating second acoustic waves that propagate along the second path segment, reflecting the second acoustic waves into the conduit and the fluid within the conduit at the second position, receiving the second acoustic waves reflected into the conduit and the fluid within the conduit at the first position, and reflecting the second received waves toward an acoustic receiver along the first path segment.

In yet another embodiment, a flow sensor for determining flow rate of a fluid is provided. The flow sensor includes a conduit having a length and a longitudinal axis that extends parallel to the length, a first ultrasonic transducer disposed at a first position along the length of the conduit, a second ultrasonic transducer disposed at a second position along the length of the conduit, and means for directing first acoustic energy from the first transducer to the second transducer such that the first acoustic energy impinges on an inner surface of the conduit at a first predetermined angle and such that the first acoustic energy passes into an interior portion of the conduit and periodically reflects off a surface of the conduit and intersects the longitudinal axis of the conduit more than once prior to reception of the first acoustic energy at the second ultrasonic transducer.

In the flow sensor, the means for directing first acoustic energy may include means for directing second acoustic energy from the second transducer to the first transducer such that the second acoustic energy impinges on an inner surface of the conduit at a second predetermined angle and such that the second acoustic energy passes into an interior portion of the conduit and periodically reflects off a surface of the conduit and intersects the longitudinal axis of the conduit more than once prior to reception of the second acoustic energy at the first ultrasonic transducer. The first predetermined angle may be substantially equal to the second predetermined angle. The fluid may be a semiconductor polishing slurry, and the flow sensor may include means for determining a flow rate of the fluid in the conduit. The first transducer may be configured to generate longitudinal acoustic waves along a first path segment, and the second transducer may be configured to generate longitudinal acoustic waves along a second path segment with the first path segment being substantially parallel to the second path segment. Each of the first path segment and the second path segment may be substantially parallel to the longitudinal axis of the conduit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1A:
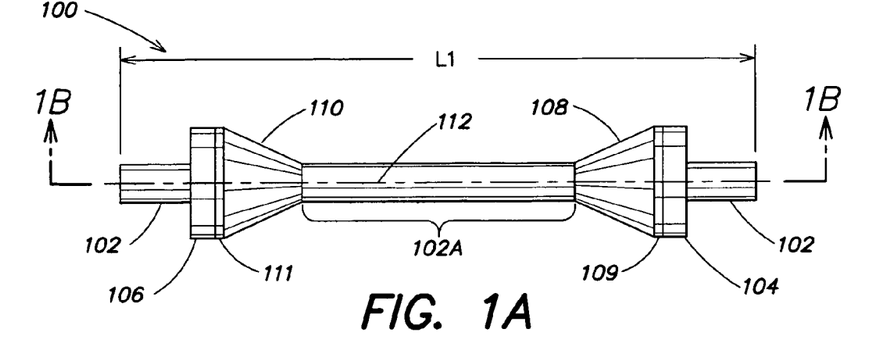
FIG. 1A is a side view of an ultrasonic liquid flow sensor in accordance with one embodiment of the present invention.

FIGS. 1A-E illustrate an ultrasonic fluid flow sensor in accordance with one embodiment of the present invention. As illustrated in FIG. 1A, the flow sensor 100 includes a conduit 102, a first ultrasonic transducer 104 disposed at a first location along a length of the conduit 102, and a second ultrasonic transducer 106 disposed at a second location along the length of the conduit 102 that is spaced apart from the first location.

Each of the ultrasonic transducers 104, 106 is ring-shaped and each is capable of operating as both a transmitter and a receiver, although the electrical signal wires used for this purpose are not shown. The first ultrasonic transducer 104 and the second ultrasonic transducer 106 are mounted about and external to the conduit 102, with the first ultrasonic transducer 104 being disposed adjacent a first reflecting interface 108, and the second ultrasonic transducer 106 being located adjacent a second reflecting interface 110. As will be described further in detail below, the reflecting interfaces 108, 110 are constructed to reflect acoustic energy (established primarily as longitudinal waves in the reflecting interface material by the motion of the transducers) into the conduit, into the liquid flowing in the conduit, and reflecting off of the outer wall of the conduit such that the acoustic energy propagates generally along the conduit and repeatedly intersects the longitudinal axis 112 of the conduit at a common angle. The energy from one transducer is reflected along in the conduit until received by the other transducer.

In the embodiment illustrated in FIGS. 1A-E, the reflecting interfaces 108, 110 are similar to one another in size and shape and are axially symmetric about the longitudinal axis 112 of the conduit 102; that is, each of the reflecting interfaces 108, 110 extends 360' annularly about the longitudinal axis 112. In this embodiment, each reflecting interface 108, 110 has a substantially conical shape and is formed integrally with the conduit 102 and from the same material. As will be described in detail further below, the size and/or shape of the reflecting interfaces 108, 110 may be varied, and they need not be integrally formed with the conduit.

As shown, each of the reflecting interfaces 108, 110 has a conical portion that terminates in a cylindrical end portion 109, 111. The cylindrical end portions 109, 111 provide a convenient mounting surface for each of the ultrasonic transducers 104, 106 and facilitate the manufacture of the sensor 100 to the desired dimensions. For example, the thickness (e.g., along the longitudinal axis 112 of the conduit) of the cylindrical end portions 109, 111 may be varied to achieve a desired distance (i.e., distance L2 in FIG. 1B) between the transducers. It should be appreciated that although the cylindrical end portions 109, 111 facilitate the manufacture of the sensor 100, they are not necessary to practice the present invention and may be omitted in certain embodiments.

The ultrasonic transducers 104, 106 are preferably centered relative to the longitudinal axis 112 of the conduit 102 and placed with one face of the transducer in registration and in acoustic contact with the flat face of the cylindrical end portions 109, 111. Where the cylindrical end portions 109, 111 are omitted, the flat face of the transducers 104, 106 may be placed in registration with the flat face of the reflecting interfaces 108, 110. In one embodiment, the ultrasonic transducers 104, 106 may be mechanically press-fit against the flat face 116, 118 (FIGS. 1B and 1E) of the cylindrical end portions 109, 111 (or the reflecting interfaces 108, 110) so that one of the flat faces of each of the transducers is in intimate acoustic contact with the flat face of its corresponding reflecting interface 108, 110. An advantage of such a construction is that it prevents any acoustic discontinuity, such as an intrusion of air, between the flat face of the transducer and the flat face of the corresponding reflecting interface 108, 110 to which it is mounted and which could attenuate, filter, disperse or otherwise degrade the acoustic signal transmitted into the reflecting interface.

In an alternative embodiment, a flat face of each of the ultrasonic transducers 104, 106 may be bonded to the flat face 116, 118 of its corresponding cylindrical end portion 109, 111 (or reflecting interface 108, 110) by use of an adhesive, such as, an epoxy. In one exemplary embodiment, a thin layer of Metacast 401ST/12 epoxy, available from Mereco Technologies Group, Inc., West Warwick, R.I. was used. To ensure that the ultrasonic energy from the transducers is transmitted into the material of the reflecting interface without undue attenuation, filtering, reflection, dispersion, etc., the acoustic properties and thickness of the bonding material used to bond the ultrasonic transducers 104, 106 to the reflecting interfaces 108, 110 should be selected to optimize ultrasonic transmission through the interface with the conduit material at the desired transmission frequency according to methods well known in the art (e.g., ¼ wave impedance matching). As will be discussed further in detail below, one advantage of bonding each of the ultrasonic transducers to the flat face of its corresponding reflecting interface is that it permits a gap to be present between the inner diameter of the ultrasonic transducer and the outer diameter of the conduit. The presence of a radial air gap between the inner diameter of the transducer and the outer diameter of the conduit helps to prevent any coupling of acoustic energy radially from the transducer into the conduit through the inner radial surface of the transducer, and to ensure that acoustic energy can only be communicated between the transducer and the conduit through the planar interface where they are joined in intimate acoustic contact. It should be appreciated that in each of the above described embodiments, because a flat face of each ultrasonic transducer is placed in registration with the flat face of it corresponding reflecting interface, the mounting of the transducers in the appropriate orientation (e.g., centered relative to the longitudinal axis 112 of the conduit 102 and with its flat faces perpendicular thereto) is greatly simplified.

In the embodiment illustrated in FIGS. 1A-E, the conduit 102 is cylindrical in shape and includes a central region 102A located between the first reflecting interface 108 and the second reflecting interface 110. This central region 102A is preferably uniform in thickness, outer diameter, and inner diameter.

Figure 1B:
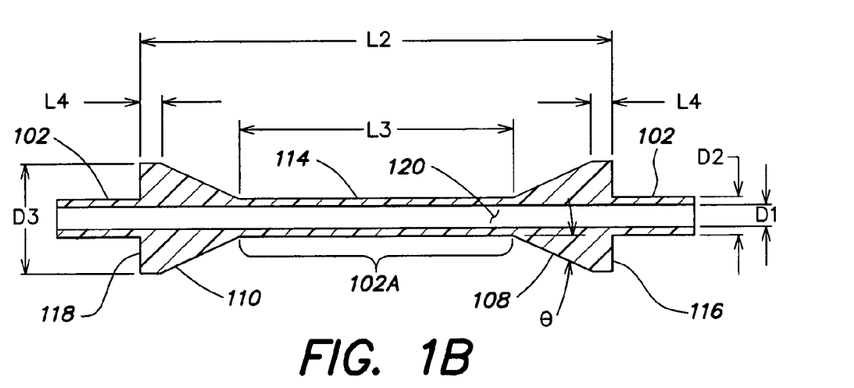
FIG. 1B is a cross-sectional view taken along lines 1B-1B of the ultrasonic liquid flow sensor of FIG. 1A, with transducers of the sensor removed.
Figure 1C:
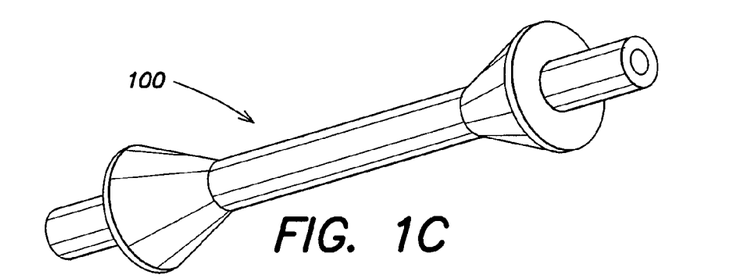
FIG. 1C is a perspective view of the ultrasonic flow sensor of FIG. 1A, with the transducers removed.
Figure 1D:
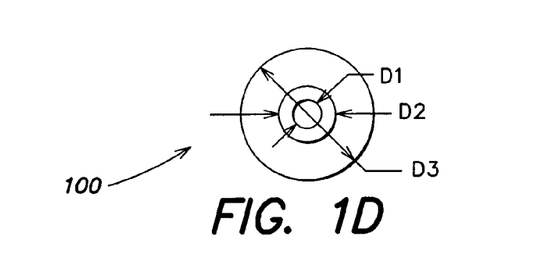
FIG. 1D is an end view of the ultrasonic flow sensor of FIG. 1A.

FIG. 1B is a cross-sectional view of the sensor 100 of FIG. 1A taken along lines 1B-1B in FIG. 1A. The cross-sectional view of FIG. 1B illustrates the construction and dimensions of the various regions of the sensor 100 in accordance with one exemplary embodiment of the present invention that is specifically adapted for use with relatively low flow rates (e.g., 5-500 ml/min) of fluids, such as semiconductor wafer polishing slurries, aqueous reagents, and other chemically aggressive liquids used in the semiconductor industry. It should be appreciated that for other types of liquids and other flow rates, the dimensions of the sensor 100 will of course vary from those described herein with respect to this specific application. For purposes of clarity, the first and second ultrasonic transducers 104, 106 are not shown in FIG. 1B.

In the exemplary embodiment shown in FIG. 1B, the overall length L1 of the conduit 102 is approximately 2.0 inches, the distance L2 between the flat faces 116, 118 of the reflecting interfaces 108, 110 is approximately 1.415 inches, and the length L3 of the central region 102A between the tapered conical faces of the reflecting interfaces 108, 110 is approximately 0.874 inches. In this exemplary embodiment, the conduit 102 has an outer diameter D2 of approximately ⅛ inches (i.e., 0.125 inches) and an inner diameter of approximately ¹⁄₁₆ inches (i.e., 0.0625 inches). The outer diameter D3 of each of the reflecting interfaces 108, 110 is approximately 0.328 inches and the thickness L4 of each of the cylindrical end portions 109, 111 is approximately 0.021 inches. In this embodiment, the angle $\theta$ relative to the longitudinal axis 112 of the conduit is approximately 22.1 degrees (such that the conical surface of each respective reflecting interface spans an included angle of approximately 44.2 degrees), although this angle may vary as described in further detail below. As shown in FIG. 1B, the sensor 100 is formed from a unitary piece of material, which in this exemplary embodiment is machined from a piece of PFA (a copolymer of tetrafluoroethylene and perfluoroalkoxy resin). In this exemplary embodiment, the interior channel 120 of the sensor is formed by drilling a ¹⁄₁₆ inch hole in the unitary piece of material, which for concentricity purposes, is preferably formed by machining a ¹⁄₁₆ inch hole from both ends of the sensor.

As shown, the sensor 100 is axially symmetric; with the central region 102A having walls 114 of uniform thickness and inner and outer diameter. The sensor 100 is also symmetric about a point located on the longitudinal axis 112 at the center of its length. This symmetry permits the sensor to be used equally well with the ultrasonic transducer 104 being disposed upstream of the ultrasonic transducer 106, or downstream of the ultrasonic transducer 106. In the illustrated embodiment, the conduit 102 has a substantially constant inner diameter (D1) and outer diameter (D2) except in the regions where the reflecting interfaces 108, 110 are located. The conduit 102, however, need not be cylindrical in shape, provided that the desired transmission of the ultrasonic signals transmitted by the ultrasonic transducers 104, 106 can be achieved with the selected geometry of the conduit 102.

Figure 1E:
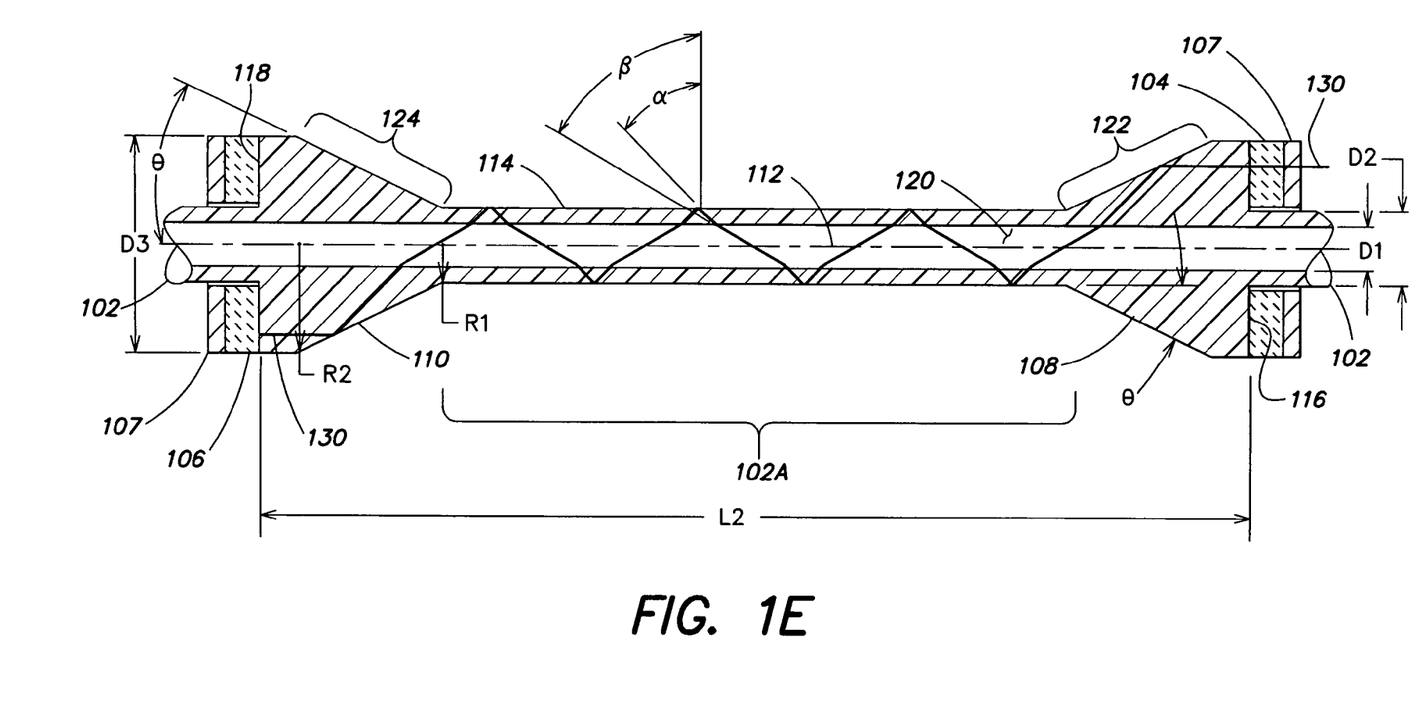
FIG. 1E is a cross-sectional view of an ultrasonic flow sensor in accordance with another embodiment of the present invention illustrating the manner in which ultrasonic energy is transmitted and received.

As illustrated in FIG. 1E, the reflecting interfaces 108, 110 each provide a surface 122, 124, respectively, that extends radially outward from the central region 102A at an angle $\theta$ relative to the longitudinal axis 112 of the conduit 102. Where the conduit walls 114 are parallel to the longitudinal axis 112, the surfaces 122, 124 are also at the angle $\theta$ relative to the conduit wall 114 as shown in reflecting interface 108 of FIG. 1E. In the embodiment shown in FIG. 1E, each surface 122, 124 extends outwardly at the same angle or at substantially the same angle.

The reflecting interfaces 108, 110 have a diameter that varies between substantially the outer diameter D2 of the conduit 102 in the central region 102A of the conduit to a diameter D3 that is substantially greater than the outer diameter D2. To aid in placement of the ultrasonic transducers, the diameter D3 is preferably substantially the same as the outer diameter of the ultrasonic transducers so that the transducers may be aligned centrally about the longitudinal axis 112 of the conduit 102. In the embodiment illustrated in FIG. 1E, the first reflecting interface 108 adjacent the first ultrasonic transducer 104 has its smallest diameter at an end of the reflecting interface 108 that is furthest from the transducer 104. In this embodiment, the second reflecting interface 110, adjacent the second ultrasonic transducer 106, also has its smallest diameter at an end of the second reflecting interface 110 that is furthest from the transducer 106. That is, each of the first reflecting interface 108 and the second reflecting interface 110 are most narrow adjacent the central region 102A.

Figure 1F:
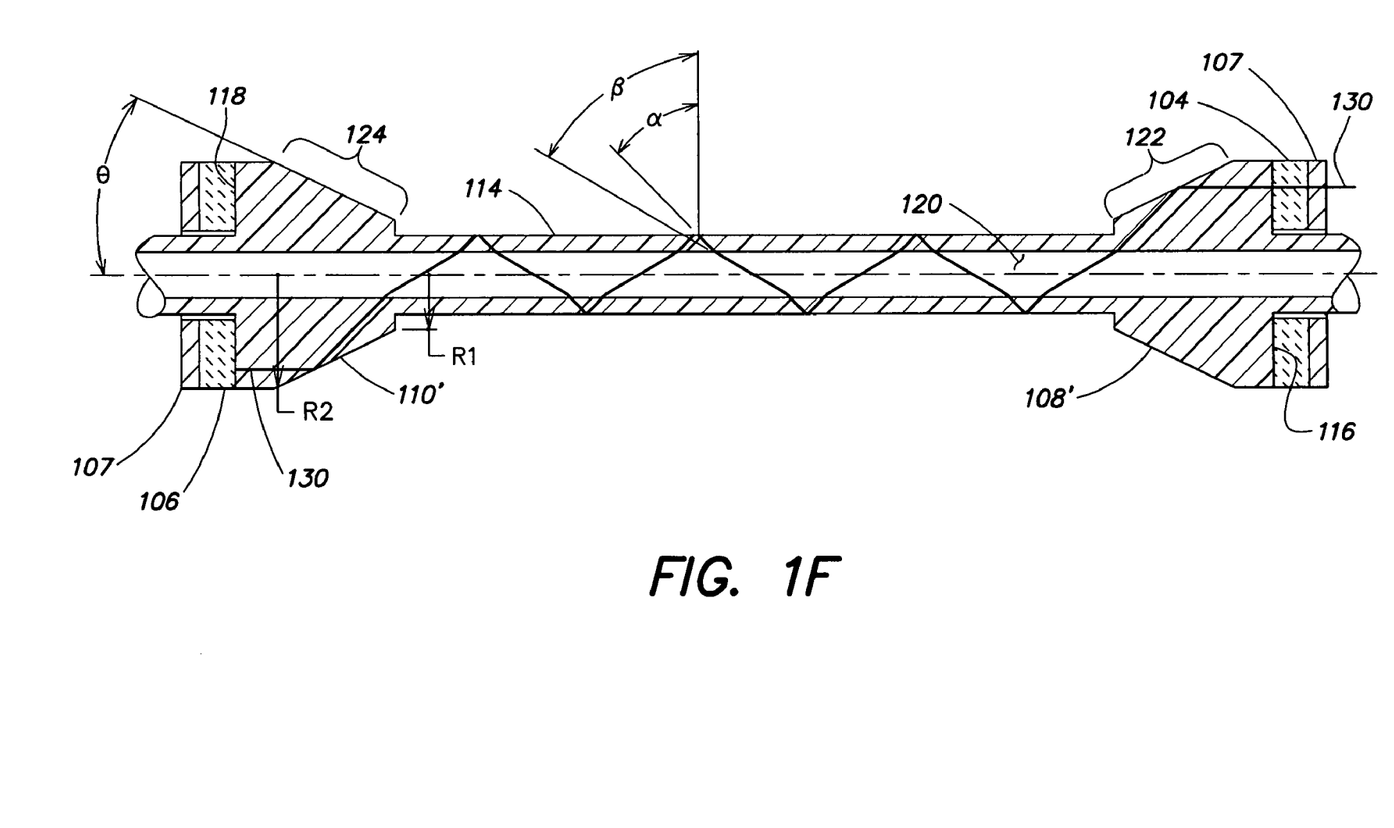
FIG. 1F is a cross-sectional view of an ultrasonic flow sensor in accordance with another embodiment of the present invention.

Although the reflecting interfaces 108, 110 have thus been described as being conical in shape, it should be appreciated that the size and/or shape of the reflecting interfaces may be varied so long as they provide a surface 122, 124 that reflects acoustic energy at the frequency established in the conduit material at a desired angle $\theta$ relative to the axis 112 of the conduit 102. Thus, the reflecting interfaces 108, 110 may be tapered regions such as the cone-shape shown in FIGS. 1A-E, or any other region that includes a surface 122, 124 extending radially away from the central region 102A of the conduit at the angle $\theta$ relative to the axis 112, where the surface 122, 124 is defined by a first radius R1 and a second radius R2. Thus, for example, rather than having a conical shape, the reflecting surfaces 108, 110 may be formed as shown in FIG. 1F, wherein the reflecting surfaces 108' and 110' are frusto-conical in shape. In the embodiments shown in FIGS. 1E and 1F, the first radius R1 is located further from the flat face 118 of the reflecting interface 110, 110' than the second radius R2.

In general, and as discussed in detail further below, it is generally preferred that the reflecting interfaces 108 and 110 in the cross-sectional view of FIG. 1E be straight rather than curved both for ease of acoustic analysis and manufacturing, although at least some embodiments of the present invention are not so limited. Indeed, as long as the reflecting interfaces 108 and 110 are capable of directing acoustic energy into the conduit wall at a determined angle, other types of surfaces may be used. For example, although not shown, the reflecting surfaces may have an arcuately curved outer surface, wherein a tangent to the point at which acoustic energy 130 (FIGS. 1E and 1F) is reflected into the conduit 102 forms the desired angle $\theta$ relative to the longitudinal axis 112 of the conduit 102. It should be appreciated that in each of these embodiments, the shape of the reflecting interfaces 108, 110 may be irregular in regions that do not participate in the reflection of acoustic energy into the conduit and the liquid therein.

In the embodiments shown in FIGS. 1A-1F, the reflecting interfaces 108, 108', 110, 110' extend 360° annularly about the conduit 102. It should be appreciated that in other embodiments, the reflecting interfaces may extend less than 360° annularly about the axis 112. For example, it should be evident to those skilled in the art that embodiments of the present invention are not limited to a sensor with complete rotational symmetry around the longitudinal axis 112 (e.g., flow axis), but may be readily adapted to flow sensor systems with lesser symmetry.

Thus, for example, a sensor conduit with a rectangular fluid cross-section may be used, where the sensor conduit also has a rectangular outer cross-section with outer planar boundaries parallel to the fluid cross-section planar boundaries. Such a system would possess reflection symmetry in two mirror planes oriented at right angles, for example, the mirror symmetry planes may be horizontal and vertical planes whose intersecting line is the centerline of the sensor conduit. In such an embodiment, the conical shape of the reflecting interface may be transformed into a wedge shape with a planar top, sides, and end face, and with the end face being perpendicular to the centerline of the sensor conduit. In such an alternative embodiment, the ultrasonic transducer may be rectangular in shape and attached to the rectangular end face of the wedge-shaped reflecting interface, and excited so as to propagate acoustic energy primarily in a direction normal to the transducer face, and parallel (or anti-parallel) to the flow direction, so that the propagated acoustic energy is reflected from the slanted planar wedge face and proceeds at the reflected angle to approach the conduit/fluid interface, where it is refracted into the fluid at a defined incidence angle. The acoustic wave would then continue bouncing and refracting down the sensor conduit until its reception by a symmetrically placed receiving reflecting interface with an attached receiving transducer. In this exemplary embodiment, the receiving wedge-shaped reflecting interface and ultrasonic transducer may be either on the same planar face of the conduit, on the opposite planar face of the conduit or both. The rectangular-shaped transducers would be selected to be either longitudinal thickness mode resonant transducers, or shear wave transducers designed to produce shear waves polarized parallel to the plane containing the conduit centerline and orthogonal to the planar face of the conduit containing the transmitting wedge-shaped reflecting interface.

It should be appreciated that such a configuration as that described immediately above differs from the prior art in that the crystal of the ultrasonic transducer that generates the ultrasonic waves has a symmetry plane, is aligned with its symmetry plane normal to the flow velocity average direction, and propagates acoustic energy through a planar surface principally in the direction normal to the surface, and parallel (or anti-parallel) to the flow direction, through an acoustic coupling medium into a parallel plane surface of a cone or wedge-shaped reflecting structure that employs reflection to redirect the energy toward the refracting conduit/fluid boundary surface so that it enters the fluid as a longitudinal wave propagating at a defined incidence angle.

Furthermore, such a design may leave two or three faces of the sensor conduit without wedge shaped reflecting surfaces. For instance the wedge shape reflecting interfaces may be built into the top and bottom (or top only) faces of the sensor conduit, leaving the front and back sides of the sensor conduit unchanged in form from the rectangular shape of the flow conduit without flow sensing capability. Alternately, there may be independently operating wedge-shaped reflecting interfaces coupled to ultrasonic transducers corresponding to the front and back planar surfaces, that may be used, for example, to provide supplemental information to enhance the accuracy of the flow measurement beyond what would be possible with operation of only the top/bottom transmitter/receivers.

In each of the previously described embodiments, the reflecting interfaces are preferably integrally formed from the same material as the conduit 102. The integral formation of the reflecting interfaces 108, 108', 110, 110' with the conduit 102 avoids the possibility of any acoustic discontinuity between the reflecting interface and the conduit 102 which could attenuate, filter, disperse or otherwise degrade the acoustic signals generated by the transducers. However, it should be appreciated that the reflecting interfaces may be separately formed structures that are bonded (e.g., glued, epoxied, thermally bonded, or welded) to the conduit 102, or otherwise attached via a mechanical interference fit between the outside diameter of the conduit 102 and the inside diameter of the reflecting interface. Where the reflecting interfaces are not integrally formed with the conduit 102, care should be exercised in attaching these structures to the conduit to avoid any acoustic discontinuity, such as for example an air gap, between the reflecting interface and the conduit. Thus, for example, if an epoxy is used, the epoxy should ideally have the same or at least similar acoustic properties (e.g., acoustic impedance and acoustic wave velocity) as the materials from which the reflecting interface and the conduit are formed, to avoid any acoustic mis-match between the different materials. In one exemplary embodiment where different types of materials are used for the reflecting interface and the conduit, the materials selected for the reflecting interfaces and the conduit may have different thermal properties, so as to be capable of being thermally bonded to one another and thereby avoid the presence of an additional bonding agent, such as an epoxy. In this embodiment, the reflecting interfaces may be formed, for example, from FEP (a polymer of tetrafluoroethylene and hexafloropropylene), the conduit may be formed from PFA, and the reflecting interfaces may be heat bonded to the conduit.

The conduit 102 and/or the reflecting interfaces 108, 108', 110, 110' may be manufactured from a variety of different materials dependent upon the properties of the fluid with which it is used. Exemplary materials for use in semiconductor processing applications may include PFA and other types of Teflon® brand fluoropolymers, although other materials such as polyvinylchloride (PVC) or polyoxymethylene (Delrin®) may be used in lower cost applications. For semiconductor applications, PFA is preferred because it is chemically inert, it is readily available with very high purity (e.g., a very low amount of metallic or other leachable ionic contaminants that could impact wafer purity) and durable. In addition, the acoustic properties of PFA (e.g., the acoustic impedance and the acoustic velocity) are relatively well matched with those of the fluids (e.g., aqueous reagents, semiconductor polishing slurries, hydrocarbons, etc.) typically encountered, and its mechanical characteristics are relatively stable over temperatures typically used in such applications. Factors that should be taken into account when selecting the type of material to be used for the conduit and/or the reflecting interfaces may include the acoustic impedance and acoustic velocity of the fluid and of the material, compatibility with the fluid with which it is used, and mechanical stability over the intended range of temperatures that may be expected to be encountered.

According to one embodiment, each ultrasonic transducer 104, 106 is a piezoelectric transducer that includes a piezoelectric ceramic element (e.g., lead zirconate-titanate) and a pair of electrodes for applying a voltage to the piezoelectric ceramic element. Each of the ultrasonic transducers 104, 106 may produce an ultrasonic wave when a voltage is applied thereto, and may produce a voltage when it receives an ultrasonic wave. Thus, each of ultrasonic transducers 104, 106 may function as an ultrasonic wave transmitter and/or an ultrasonic receiver. In one embodiment, the ultrasonic transducers 104, 106 may each be ring-shaped piezoelectric oscillators that are mounted to an exterior surface of the conduit 102. In one embodiment, the ultrasonic transducers 104, 106 are longitudinal thickness mode transducers that project acoustic energy parallel or substantially parallel to the axis 112 of the conduit in the direction of the flat faces 116, 118 of the adjacent reflecting interfaces 108, 110. It should be appreciated, however, that the ultrasonic transducers 104, 106 need not be ring-shaped, as other alternative shapes may be used provided that they are capable of directing ultrasonic energy substantially parallel to the longitudinal axis 112 of the conduit 102 into the face of an adjacent reflecting interface 108, 110. For example, in another embodiment, the ultrasonic transducers 104, 106 extend annularly around the exterior of the conduit 102 for less than 360°.

Each ultrasonic transducer 104, 106 may include a backing 107 (shown in FIG. 1E) that, in various embodiments, may be selected to enhance energy transmission (e.g., to act as a passive resonator) into the reflecting interface 108, 110, or to suppress (e.g., dampen) unwanted resonance modes and/or frequencies that might interfere with transmission of the desired ultrasonic signal and ensure that predominantly longitudinal waves of a desired frequency are propagated in the reflecting interface material. In FIG. 1E, the backing is shown as a thin layer, however, depending on the material used, the backing may actually be thicker than the crystal portion of the transducer. In one embodiment in which the backing is used to suppress unwanted resonance modes and/or frequencies, the material of the backing 107 is a highly attenuating material closely matched in acoustic impedance to the transducer. In this embodiment, the backing 107 is used to control the vibration of the transducer by absorbing energy radiating from the back face of the transducer (i.e., the face of the transducer opposite the flat face of the reflecting interface). By absorbing the energy radiating from the back face of the transducer, this shortens the impulse response of the transducer and permits the receiving transducer to be able to more clearly discriminate and resolve signals arriving closely spaced in time. On the transmission side, such energy absorption enables the transducer to transmit very short signals that are spaced apart closely in time. In one version of this embodiment, the backing 107 is selected from materials such as lead, tungsten, or a metal powder in a rubber binder as is known in the art.

In another embodiment in which the backing 107 is used to enhance energy transmission, the backing 107 may be selected in accordance with specifics of the ultrasonic transducer. For example, in one embodiment in which the piezoelectric ceramic elements of the transducers have a half wave thickness resonance at approximately 600 kHz (and are anti-resonant at about 300 kHz), a high acoustic impedance material may be used as the backing 107 to shift the ceramic elements to a quarter wave resonance mode that provides clear transmission at approximately 300 kHz. Exemplary materials that may be used for the backing 107 to enhance energy transmission generally have an acoustic impedance that is at least twice that of the piezoelectric ceramic elements of the transducers, such as tungsten, steel, uranium, platinum, and tungsten carbide. Such a high impedance backing 107 increases the energy transmission into the reflecting interface to provide a stronger ultrasonic signal that is more easily detected by the receiving ultrasonic transducer. Although the thickness of the backing 107 may vary depending on the type of material used, in one embodiment, a ¼ wavelength thick tungsten carbide backing 107 that was approximately 5.5 mm (0.218 inches) thick was used with a piezo-electric ultrasonic transducer having a piezoelectric ceramic element manufactured from lead-zirconate-titanate (PZT) to enhance transmission of ultrasonic energy at a frequency of approximately 300 kHz. The selected operating frequency of the ultrasonic transducers will, of course, vary dependent upon the acoustic properties of the conduit material and the fluid and upon the dimensions of the conduit.

As previously noted, where externally mounted ultrasonic transducers 104, 106 are employed, the flat surfaces 116, 118 provide a uniform flat mounting surface that aids in centering the transducers 104, 106 about the longitudinal axis 112 of the conduit. This is particularly advantageous where it is desired to include a radial air gap between the inner radial surface of the transducers 104, 106 and the wall 114 of the conduit. Such an air gap may be used to suppress transmission of radial vibrations from the transducers 104, 106 to the conduit 102, and ensure that ultrasonic energy in the form of longitudinal waves is directed into the conduit and then the fluid flowing therein.

Operation of an embodiment of the flow sensor 100 is now described herein with reference to FIG. 1E. In broad overview, the above described embodiments of an ultrasonic flow sensor provide a predictable and superior coupling between exteriorly mounted ultrasonic transducers and the fluid contained within the interior channel 120 of the conduit 102. The geometry of the reflecting interface and the conduit takes acoustic energy established in the material of the reflecting interface by ultrasonic transducer motion, reflects those waves into the conduit directed at a specific angle 2*θ, where they are then refracted into the contained fluid and periodically reflect off of the conduit so as to travel generally along the longitudinal axis 112 of the conduit 102 and repeatedly intersect the axis at a common angle. This is in contrast to other types of ultrasonic liquid flow sensors, such as those described in U.S. Pat. Nos. 6,055,868 and 5,974,897, which propagate acoustic energy in a fluid starting with waves emanating generally radially across a continuum of angles, generated in the conduit material by radial motion of an ultrasonic transducer, and using the geometry of that conduit to guide a portion of those radially directed waves into waves traveling with a distribution of angles in both directions along the longitudinal axis of the enclosed fluid. In embodiments of the present invention, viewed from a wave perspective rather than a ray perspective, the fluid in the interior channel 120 of the conduit 102 and the conduit wall 114 together form an acoustic waveguide along which coupled ultrasonic waves propagate. Waves launched from a transmitting transducer at one end of the ultrasonic sensor conduit will symmetrically emerge from the opposite end whereby the waves are coupled into a receiving transducer. Ray tracing propagation analysis shows the waves zigzag back and forth across the diameter of the waveguide formed by the conduit walls and the fluid; consequently, the upstream-downstream time of flight difference develops from both velocity of the fluid and flow-induced minor changes to the acoustic path taken. In embodiments of the invention, the reflecting interfaces provide for transmission and reception at a defined angle.

In different embodiments, the angle θ that the reflecting surface of the reflecting interfaces form relative to the longitudinal axis of the conduit will vary dependent upon the mechanical dimensions of the conduit and the acoustic properties of the materials and the fluid. Applicants have empirically determined that for at least some embodiments, the angle θ should preferably be between approximately 18° and 27°, and more preferably between approximately 20° and 24°.

It should be appreciated that the number of periodic reflections in the zigzag path between the transmitting transducer and the receiving transducer will depend on the angle at which acoustic energy is reflected by the reflecting surface of the reflecting interface, the length L1, and also the acoustic properties of the material from which the reflecting interfaces/conduit are formed and the fluid flowing therein.

In general, the dimensions of the ultrasonic sensor conduit are chosen in an engineered trade-off among the magnitude of the fluid flow to be measured, apparatus size requirements, material properties of the conduit material, and other considerations. The five material properties of primary concern are the longitudinal wave velocity and the acoustic impedance within both the conduit material and the fluid, and also the shear wave velocity in the conduit. Secondary properties which may also be considered include sound attenuation within the fluid and in the conduit material, operating temperature range (as the acoustic properties of the conduit material and the fluid may be expected to change with temperature), and the fluid pressure range, for example. The four geometric characteristics of primary concern relative to the sensor conduit are the conduit inside diameter, the outside diameter of the central portion 102A of the conduit, the angle that the reflecting surface of the reflecting interface forms with the longitudinal axis of the conduit, and the length from the flat face of one reflecting interface to the flat face of the other. The selected combination should be selected to ensure that the acoustic energy (ray analysis) undergoes an integral number of reflections at the outer surface of the central portion of the conduit while transiting from the flat face of one reflecting interface to the flat face of the other. Secondary mechanical considerations may, for example, include the desired operating frequency of the ultrasonic transducers, manufacturing methods, and packaging constraints.

In at least one embodiment, a sensor is designed with combinations of conduit material and fluid such that (a) the ratio of longitudinal sound velocities range between 0.5 and 2.0, and (b) the ratio of acoustic impedances range between 0.17 and 5.8, and more preferably between 0.3 and 3.0. These parameter ranges point toward measuring the flow of aqueous reagents, semiconductor polishing slurries, hydrocarbons, and similar liquids, in ultrasonic sensor conduits constructed of selected plastics. It should be appreciated that aspects of the present invention are amenable to measuring the flow rates of other types of fluids, where the acoustic impedance ratio of the conduit relative to that of the fluid is relatively close to unity (e.g., greater than approximately 0.17 and less than approximately 5.8). For example, aspects of the present invention may be used to measure the flow of liquid metals, such as mercury flow within a lead conduit, or liquid sodium metal flow within a suitable metal conduit. Alternatively, aspects of the present invention may be used, for example, with small diameter PVC piping conveying water, where the small diameter renders conventional shear mode wedge-shaped transducers difficult to fabricate, or in larger diameter PVC piping conveying highly attenuating fluids, where the attenuating characteristics of the fluid makes it necessary to utilize acoustic frequencies where the wavelength is comparable to the inner diameter of the piping.

Referring now to FIG. 1E, and as mentioned above, ultrasonic energy 130 is transmitted from the second ultrasonic transducer 106 into the face 118 of the reflecting interface 110. The ultrasonic energy is generated in a direction that is substantially parallel to the longitudinal axis 112 of the conduit 102 and propagates in the material of the reflecting interface primarily in the form of longitudinal waves.

Within the reflecting interface 110, the ultrasonic energy continues to travel substantially parallel to the longitudinal axis 112 of the conduit 102. Upon reaching the surface 124 the ultrasonic energy 130 is reflected, since the acoustic impedance of the air surrounding the sensor is substantially less than that of the material from which the reflecting interface and the conduit are formed. At the reflective surface 124, the ultrasonic energy is reflected at an angle $\theta$ (relative to the reflective surface 124) that is equal to the angle of incidence, and thus it propagates toward the channel 120 in a direction equal to the included angle $2*\theta$ (relative to the longitudinal axis 112) of the conical reflecting interface 110, and has an angle of incidence $\alpha$ at the conduit/liquid interface, where $\alpha=90°-2*\theta$ (since the reflective surface is itself at an angle $\theta$ relative to the longitudinal axis). The angle of refraction $\beta$, which is given by Snell's law, for the propagating wave that passes into the liquid may be determined as $\beta=\arcsin(\sin(\alpha)*V_{liquid}/V_{conduit})$, where $V_{liquid}$ is the acoustic velocity of the longitudinal wave in the liquid and $V_{conduit}$ is the acoustic velocity of the longitudinal wave in the conduit material. The angles $\alpha$ and $\beta$ are measured relative to a line normal to the interface between the conduit wall 114 and the interior 120 of the conduit 102.

The wave continues to propagate along the conduit 102 along a zig-zag path where it is reflected by the conduit walls at the angle $\alpha$ (due to the difference in acoustic impedance between the conduit material and the air surrounding the conduit) and refracted at the conduit wall/liquid interface at the angle $\beta$ (due to the difference between the longitudinal velocity of the wave in the liquid and the longitudinal velocity of the wave in the conduit material), until it enters the reflecting interface 108. Within the reflecting interface 108, the acoustic wave is reflected by the surface 122, and is received by the first ultrasonic transducer 104.

Transmission of an ultrasonic signal from the first ultrasonic transducer 104 to the second ultrasonic transducer occurs in the opposite direction but in a similar fashion. That is, the geometry and construction of the conduit 102 and the reflecting interfaces 108, 110 allow for the transmission of a longitudinal ultrasonic wave from the first ultrasonic transducer 104 to the second ultrasonic transducer 106.

In the embodiment illustrated in FIG. 1E, and based upon the dimensions described with respect to the embodiment of FIG. 1B, the angle $\alpha$ is approximately 45.8° and the angle $\beta$ is approximately 60° where the angles $\alpha$ and $\beta$ are measured relative to a line normal to the interface between the conduit wall 114 and the interior 120 of the conduit 102. Provided that the acoustic velocity of a longitudinal wave in the reflecting interface/conduit material and the liquid are known or may be empirically determined, the angles $\theta$, $\alpha$, and $\beta$ may be selected to propagate ultrasonic energy from the second ultrasonic transducer 106 to the first ultrasonic transducer 104 while allowing for some variation in acoustic properties of the fluid and/or the conduit material, as well as manufacturing tolerances. It should be appreciated that the acoustic properties (e.g. the acoustic velocity and the acoustic impedance) of the liquid and of the conduit will typically vary with temperature. Indeed, such acoustic properties of the conduit material and the fluid may change by as much as 10% over a 50° C. operating temperature range. Despite such changes in acoustic properties over temperature, embodiments of the present invention have been shown to provide demonstrably better results over such a temperature operating range than conventional designs.

Embodiments of flow sensors described above (and those described below) may be used in systems to determine flow rates as described herein and further described in co-pending U.S. patent application Ser. No. 10/878,974 discussed above. In such a system, control electronics may be used to apply voltages to and detect voltages from the transducers of the flow sensors. The control electronics can determine flow rate based on the times of travel of waves in the sensor from one transducer to the other. In one embodiment, time of travel in only one direction may be used, while in other embodiments, the difference in times of travel for upstream waves versus downstream waves may be used.

Although the embodiments of the present invention discussed above have been described with respect to an ultrasonic flow sensor having only two ultrasonic transducers, each of which is capable of transmitting and receiving ultrasonic energy, it should be appreciated that aspects of the present invention may advantageously be used in other types of ultrasonic flow sensors. For example, the embodiment illustrated in FIG. 2 utilizes two ultrasonic transducers 204, 206 disposed at opposite ends of a conduit 202, with a third ultrasonic transducer 250 disposed therebetween. Ultrasonic transducer 250 is aligned with reflecting interfaces 252 and 254 that are similar to reflecting interfaces 208 and 210. The two ultrasonic transducers 204, 206 are disposed in registration with the flat face of a respective reflecting interface 208, 210 as in the previously described embodiments, but each is used in only one mode of operation; that is, either as a transmitter of ultrasonic energy, or as a receiver of ultrasonic energy.

Figure 2:
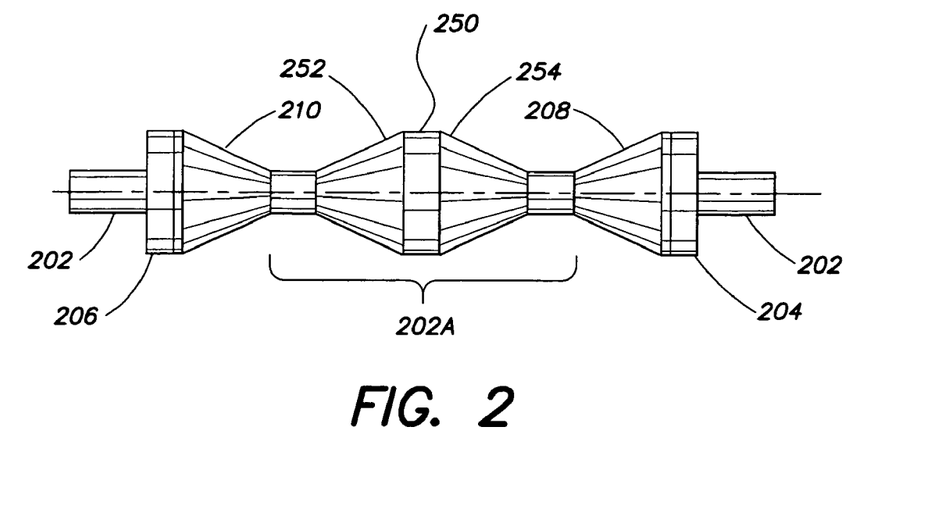
FIG. 2 is a side view of an ultrasonic flow sensor in accordance with another embodiment of the present invention in which three ultrasonic transducers are used.

In a first embodiment, each of the ultrasonic transducers 204, 206 is used solely to receive ultrasonic energy, and the third ultrasonic transducer 250 is used solely to transmit ultrasonic energy, in a manner similar to that described in U.S. Pat. No. 5,974,897. The third ultrasonic transducer 250 would be used in a longitudinal thickness mode of operation to generate ultrasonic energy that reflects off of reflecting interfaces 252 and 254, propagates both upstream and downstream, and is received by the reflecting interfaces 210, 208 and reflected toward the ultrasonic transducers 206 and 204, respectively. Due to the superior coupling of acoustic energy, a substantially stronger acoustic signal would be received by each of the transducers 206, 204 than in the '897 patent. Because the ultrasonic energy transmitted upstream and downstream would be generated at the same moment in time, only the received signals need be measured to determine (along with other information, such as the mechanical dimensions of the conduit, the distances separating the transducers, the acoustic velocity in the fluid and the conduit material, etc.) the flow rate of the fluid. Indeed, in such an embodiment, only the difference in time between receipt of the upstream and downstream acoustic signals need be measured, with that difference in time being indicative of the flow rate of the fluid.

In an alternative embodiment, each of the ultrasonic transducers 204, 206 is disposed in registration with the flat face of a respective reflecting interface 208, 210, but each is used solely to transmit ultrasonic energy (upstream and downstream) toward the third ultrasonic transducer 250, and the third ultrasonic transducer 250 is used solely to receive ultrasonic energy.

In contrast to the ultrasonic flow sensor described in the '897 patent which utilizes radial energy generated in the conduit material to generate longitudinal waves in the fluid, this embodiment, like the previously described embodiments of FIGS. 1A-E, generates longitudinal waves in the reflecting interface which are then reflected into the conduit and the fluid therein. In this embodiment, both of the ultrasonic transducers 204, 206 may be used to transmit an ultrasonic signal at the same moment in time, such that only the received signals are needed to determine the flow rate of the fluid. In one embodiment, circuitry may be used so that only the difference in time between receipt of the signal from ultrasonic transducer 204 and ultrasonic transducer 206 is measured, with that difference in time being indicative of the flow rate of the fluid. Cross-correlation techniques similar to those described in the co-pending application may then be used to determine the flow rate of the fluid.

Figure 3A:
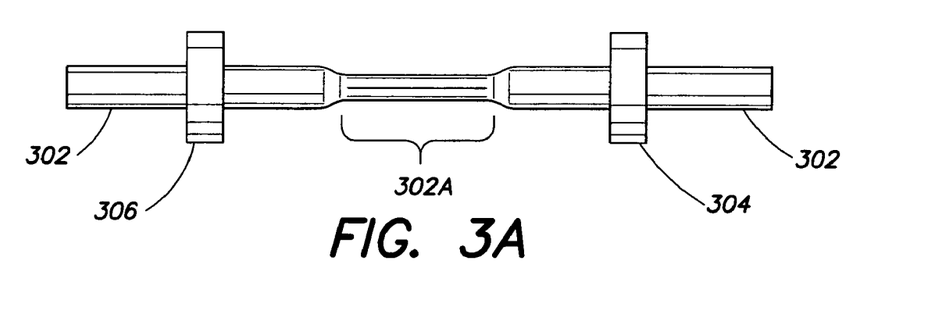
FIGS. 3A and 3B illustrate a side view and an end view, respectively, of an ultrasonic flow sensor in accordance with another embodiment of the present invention.
Figure 3B:
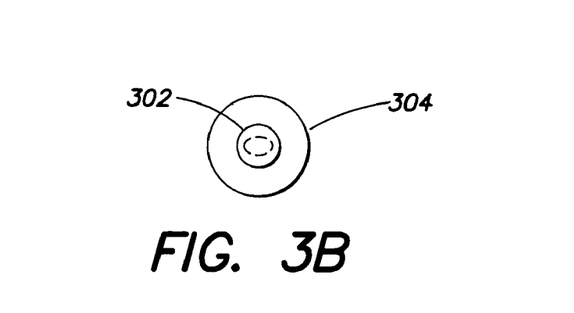

FIGS. 3A and 3B illustrate yet another embodiment of the present invention. As in the embodiments of FIGS. 1A-F, this embodiment again includes two ultrasonic transducers 304, 306 disposed at opposite ends of a conduit 302. As in the previous embodiments, the ultrasonic transducers are preferably ring shaped. However, in contrast to the embodiments of FIGS. 1A-F and 2, this embodiment does not utilize reflecting interfaces. Instead, the ultrasonic transducers are press-fit or epoxied in place about the conduit 302 so that the flat faces of the transducers are perpendicular to the longitudinal axis of the conduit 302. In further contrast to the embodiments described above with respect to FIGS. 1A-F and 2, in this embodiment, the ultrasonic ring-shaped transducers are used in a radial mode to generate longitudinal waves within the conduit and the fluid therein. However, in contrast to the technology described in U.S. Pat. Nos. 6,055,868, and 5,974,897, rather than having a uniform shape and constant diameter throughout the entire length of the conduit, this embodiment utilizes a central region 302A that is of reduced cross-sectional area relative to the ends of the conduit 302. As will be appreciated by those skilled in the art, because of the reduced cross-sectional area in the central region 302A, the velocity of the fluid flowing in the conduit in this region is increased. As a result, for a given volumetric flow rate of fluid, the velocity of the fluid is increased, thereby creating a larger difference between the upstream and downstream acoustic transmission times. This in turn permits better resolution at a given volumetric flow rate than for example, the technology described in the 868 and '897 patents, and enables this embodiment to be used with flow rates that would otherwise be too low to measure any appreciable difference.

It should be appreciated that the principle of reducing the cross-sectional area of the central region of the conduit described with respect to FIGS. 3A ad 3B may also be applied to the embodiments of FIGS. 1A-F. Thus, the embodiments of FIGS. 1A-F which utilize reflecting interfaces 108, 110, and 108', 110' may be used in combination with a central section of the conduit having a reduced cross-sectional area relative to other regions of the conduit. Rather than utilizing the ultrasonic transducers in a radial mode of operation as described with respect to FIGS. 3A and 3B, such an embodiment could then utilize the ultrasonic transducers to direct longitudinal acoustic wave energy into the reflecting interfaces 108 and 110, and 108' and 110'.

Although the embodiments described above with respect to FIGS. 1A-E and 2 have been described primarily in terms of longitudinal waves, it should be appreciated that the present invention is not so limited. In this regard, those skilled in the art will appreciate that a longitudinal wave incident on an outer boundary of a solid, such as the reflecting interfaces 108, 110 will in general also produce a reflected shear wave that propagates away from the surface at a different reflection angle from the reflected longitudinal wave generated at the same longitudinal incidence angle. The reflected shear wave will be polarized in a plane passing through the cylindrical symmetry axis of the flow sensor conduit. Thus, one may excite the crystal within the ultrasonic transducer to generate longitudinal waves propagating normal to the flat face of the transducer and incident on the conical reflecting surface of the reflecting interface, but which reflect as radially polarized shear waves. Such radial polarized shear waves will propagate as shear waves until they reach the conduit/fluid interface between the sensor conduit 102 and the flowing fluid, after which they will refract into the fluid as longitudinal waves (as fluids cannot normally propagate shear waves beyond a short 'skin depth'.) The angle that the reflecting surface of the reflecting interface makes with the longitudinal axis of the conduit and the axial spacing of the reflecting interfaces would, of course, be different for such a modified sensor, but such a design could be used, for example, to take advantage of a maximum in the shear wave reflection coefficient from an incident longitudinal wave reflecting from a material outer boundary at a determined angle. Further, there may be advantages in the amount of wave energy refracted into the fluid if the wave incident on the conduit/fluid interface is a vertically polarized shear wave within an appropriate angular range.

Thus, if the ultrasonic transducers are excited in a frequency range corresponding to a radial resonance, they will directly generate radially polarized shear waves that will propagate in a range of angles close to the normal of the front face of the transducer, and will be conducted normally into the flat face of the reflecting interface. These radially polarized shear waves will then reflect from the conically-shaped reflecting surface of the reflecting interface as vertically polarized shear waves relative to the reflecting surface local normal. Although there would also be reflected longitudinal waves arising from the reflection of the incident radially polarized shear waves from the reflecting surface, one skilled in the art could optimize the angle of the reflecting surface and the end face separation to properly align the ray path of any of these and other possible combinations of shear and longitudinal ray segments.

Although embodiments of the present invention have been described herein primarily in terms of relatively low fluid flow rates (e.g., 5-50 ml/min) and relatively small conduit inner diameters (e.g., approximately 1/16"), it should be appreciated that the present invention is not so limited. In this regard, larger diameter conduits could be used using the same principles. Thus for example, where the inner diameter of the fluid were increased to approximately 1/8", flow rates on the order of up to approximately 8 liters/min could be accurately measured.

As described herein, embodiments of the flow sensor 100 may be advantageously employed in applications that require non-invasive methods of measuring small liquid flow rates. For example, the flow sensor 100 may be employed in the manufacturing of semiconductors, pharmaceuticals, fine-chemicals, and food flavorings. These examples, however, are not meant to be limiting as the flow sensor 100 can also be employed in a wide variety of applications including those that use corrosive or reactive liquids, and those that measure higher volume fluid flows. Flow sensor 100 may also be employed in the pulp and paper, electroplating, and dyeing industries, for example, and also in medical applications. For example, the flow sensor 100 can be used to sense flow in intravenous drip applications where low volumes of fluid flow through small diameter conduit is closely controlled. It should further be appreciated that the flow sensors according to the present invention may be used with a control system and a valve or pump to provide a liquid flow controller capable of controlling relatively small fluid flows.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A flow sensor comprising:
   a conduit having a length and a longitudinal axis that extends parallel to the length;
   a first ultrasonic transducer disposed at a first position along the length of the conduit, the first ultrasonic transducer having a transducer face configured to receive and transmit acoustic energy along a first path segment;
   a second ultrasonic transducer disposed at a second position along the length of the conduit, the second ultrasonic transducer having a transducer face configured to receive and transmit acoustic energy along a second path segment;
   a first reflecting interface having a first reflecting surface positioned to reflect acoustic energy from a direction along one of the first path segment and a third path segment to a direction along the other of the first path segment and the third path segment, the third path segment extending from the first reflecting surface to the longitudinal axis;
   and a second reflecting interface having a second reflecting surface positioned to reflect acoustic energy from a direction along one of the second path segment and a fourth path segment to a direction along the other of the second path segment and the fourth path segment, the fourth path segment extending from the second reflecting surface to the longitudinal axis.

2. The flow sensor of claim 1, wherein each of the first path segment and the second path segment is substantially parallel to the longitudinal axis.

3. The flow sensor of claim 2, wherein the third path segment intersects the longitudinal axis at a first acute angle, and the fourth path segment intersects the longitudinal axis at a second acute angle with the first acute angle being substantially equal to the second acute angle.

4. The flow sensor of claim 3, wherein the first ultrasonic transducer is configured to transmit acoustic energy as a longitudinal acoustic wave toward the first reflecting surface and the second ultrasonic transducer is configured to transmit acoustic energy as a longitudinal acoustic wave toward the second reflecting surface.

5. The flow sensor of claim 4, wherein the first reflecting interface and the second reflecting interface are integrally formed with the conduit and from a same material as the conduit.

6. The flow sensor of claim 5, wherein the first reflecting interface and the second reflecting interface are symmetric about the longitudinal axis.

7. The flow sensor of claim 6, wherein each of the first reflecting surface and the second reflecting surface is formed at an acute angle with respect to the longitudinal axis of the conduit.

8. The flow sensor of claim 7, wherein the first reflecting interface has a flat face in registration with the transducer face of the first ultrasonic transducer, and wherein the transducer face of the first reflecting interface is perpendicular to the longitudinal axis of the conduit.

9. The flow sensor of claim 8, wherein the second reflecting interface has a flat face in registration with the transducer face of the second ultrasonic transducer, and wherein the flat face of the second reflecting interface is perpendicular to the longitudinal axis of the conduit.

10. The flow sensor of claim 1, wherein a ratio of an outer diameter of the conduit relative to an inner diameter of the conduit is approximately 2.

11. The flow sensor of claim 1, wherein the conduit is constructed and arranged to reflect acoustic energy received from the first reflecting surface towards the second reflecting surface along a direction that is approximately perpendicular to the transducer face of the second ultrasonic transducer.

12. The flow sensor of claim 11, wherein the conduit is constructed and arranged to reflect acoustic energy received from the second reflecting surface towards the first reflecting surface along a direction that is approximately perpendicular to the transducer face of the first ultrasonic transducer.

13. The flow sensor of claim 1, wherein the first and second ultrasonic transducers are ring shaped ultrasonic transducers.

14. The flow sensor of claim 13, wherein each of the first and second ultrasonic transducers has an inner diameter that is greater than an outer diameter of the conduit.

15. The flow sensor of claim 14, wherein the inner diameter of each of the first and second ultrasonic transducers is spaced apart from the outer diameter of the conduit to provide an air gap there between.

16. The flow sensor of claim 15, wherein the first and second reflecting interfaces and the conduit are formed from PFA.

17. The flow sensor of claim 1, wherein the first reflecting interface and the second reflecting interface are integrally formed with the conduit and from a same material as the conduit.

18. The flow sensor of claim 1, wherein the first reflecting interface and the second reflecting interface are symmetric about the longitudinal axis of the conduit.

19. The flow sensor of claim 1, wherein each of the first reflecting surface and the second reflecting surface is formed at an acute angle with respect to the longitudinal axis of the conduit.

20. The flow sensor of claim 19, wherein the reflecting surface of each of the first reflecting interface and the second reflecting interface is formed at an acute angle that is between approximately 18 and 27 degrees with respect to the longitudinal axis of the conduit.

21. The flow sensor of claim 1, wherein the first reflecting interface has a flat face in registration with the transducer face of the first ultrasonic transducer, and wherein the transducer face of the first reflecting interface is perpendicular to the longitudinal axis of the conduit.

22. The flow sensor of claim 21, wherein the second reflecting interface has a flat face in registration with the transducer face of the second ultrasonic transducer, and wherein the flat face of the second reflecting interface is perpendicular to the longitudinal axis of the conduit.

23. The flow sensor of claim 22, wherein a ratio of an outer cross-sectional dimension of the conduit relative to an inner cross-sectional dimension of the conduit is approximately 2.

24. The flow sensor of claim 1, further comprising a third ultrasonic transducer disposed at a third position along the length of the conduit, the third position being spaced between the first and second positions.

25. The flow sensor of claim 1, wherein the first reflecting interface and the second reflecting interface have a conical shape.

26. The flow sensor of claim 25, wherein the conical shape of the first reflecting interface and the second reflecting interface extends about the conduit 360 degrees.

27. The flow sensor of claim 1, wherein the first reflecting interface, the second reflecting interface, and the conduit are axially symmetric.

28. The flow sensor of claim 1, wherein the first reflecting surface and the second reflecting surface have a conical shape.

29. A method of measuring flow rate of a fluid in a conduit, comprising acts of:
generating first acoustic waves that propagate along a first path segment;
reflecting the first acoustic waves into the conduit and the fluid within the conduit at a first position spaced along a length of the conduit;
receiving the first acoustic waves reflected into the conduit and the fluid within the conduit at a second position that is spaced apart from the first position along the length of the conduit; and
reflecting the received waves toward an acoustic receiver along a second path segment.

30. The method of claim 29, wherein the act of generating first acoustic waves includes generating longitudinal acoustic waves.

31. The method of claim 30, wherein the act of reflecting includes reflecting the first acoustic waves toward the conduit such that the first acoustic waves are incident on an outer surface of the conduit at a predetermined angle relative to a longitudinal axis of the conduit.

32. The method of claim 31, wherein the act of reflecting includes reflecting the first acoustic waves such that the first acoustic waves pass into an interior portion of the conduit and periodically reflect off a surface of the conduit and intersect the longitudinal axis of the conduit more than once prior to reception of the first acoustic waves.

33. The method of claim 32, wherein the first path segment is substantially parallel to the second path segment.

34. The method of claim 33, wherein the act of reflecting the waves into the conduit includes positioning a first reflecting surface at a first reflection angle relative to the first path segment, and wherein the act of reflecting the received waves includes positioning a second reflecting surface at a second reflection angle relative to the first path segment with the first reflection angle being substantially equal to the second reflection angle.

35. The method of claim 34, wherein each of the first reflecting surface and the second reflecting surface has a conical shape and is integrally formed with the conduit and made from a same material as the conduit.

36. The method of claim 35, wherein the fluid is a semiconductor polishing slurry, and wherein the method further includes determining a flow rate of the fluid in the conduit.

37. The method of claim 35, further comprising:
generating second acoustic waves that propagate along the second path segment;
reflecting the second acoustic waves into the conduit and the fluid within the conduit at the second position;
receiving the second acoustic waves reflected into the conduit and the fluid within the conduit at the first position; and
reflecting the second received waves toward an acoustic receiver along the first path segment.

38. The method of claim 29, wherein a ratio of an acoustic impedance of the conduit relative to an acoustic impedance of the fluid is between approximately 0.17 to 5.8.

39. The method of claim 29, wherein a ratio of an acoustic impedance of the conduit relative an acoustic impedance of the fluid is between approximately 0.3 to 3.

40. The method of claim 29, wherein a ratio of a longitudinal velocity of the acoustic waves in the conduit relative to a longitudinal velocity of the acoustic waves in the fluid is approximately 0.5 to 2.

41. The method of claim 29, wherein the act of generating first acoustic waves includes generating shear acoustic waves.

42. The method of claim 29, wherein the act of generating first acoustic waves includes generating radially polarized shear waves.

43. The method of claim 29, wherein the act of reflecting the first acoustic waves includes reflecting the first acoustic waves such that the first acoustic waves pass into an interior portion of the conduit and periodically reflect off a surface of the conduit and intersect the longitudinal axis of the conduit more than once prior to reception of the first acoustic waves.

44. The method of claim 29, wherein the first path segment is substantially parallel to the second path segment.

45. The method of claim 29, wherein the act of reflecting the waves into the conduit includes positioning a first reflecting surface at a first reflection angle relative to the first path segment, and wherein the act of reflecting the received waves includes positioning a second reflecting surface at a second reflection angle relative to the first path segment with the first reflection angle being substantially equal to the second reflection angle.

46. The method of claim 45, wherein each of the first reflecting surface and the second reflecting surface has a conical shape and is integrally formed with the conduit and made from a same material as the conduit.

47. The method of claim 29, wherein the fluid is a semiconductor polishing slurry, and wherein the method further includes determining a flow rate of the fluid in the conduit.

48. The method of claim 29, further comprising:
generating second acoustic waves that propagate along the second path segment;
reflecting the second acoustic waves into the conduit and the fluid within the conduit at the second position;
receiving the second acoustic waves reflected into the conduit and the fluid within the conduit at the first position; and
reflecting the second received waves toward an acoustic receiver along the first path segment.

49. The method of claim 48, wherein the act of reflecting the first acoustic waves includes reflecting the first acoustic waves such that the first acoustic waves pass into an interior portion of the conduit and periodically reflect off a surface of the conduit and intersect the longitudinal axis of the conduit more than once prior to reception of the first acoustic waves.

50. The method of claim 49, wherein the act of reflecting the second acoustic waves includes reflecting the second acoustic waves such that the second acoustic waves pass into an interior portion of the conduit and periodically reflect off a surface of the conduit and intersect the longitudinal axis of the conduit more than once prior to reception of the second acoustic waves.

51. The method of claim 50, wherein the fluid is a semiconductor polishing slurry, and wherein the method further includes determining a flow rate of the fluid in the conduit.

52. A flow sensor for determining flow rate of a fluid, the flow sensor comprising:
- a conduit having a length and a longitudinal axis that extends parallel to the length;
- a first ultrasonic transducer disposed at a first position along the length of the conduit;
- a second ultrasonic transducer disposed at a second position along the length of the conduit; and
  - means for directing first acoustic energy from the first transducer to the second transducer such that the first acoustic energy impinges on an inner surface of the conduit at a first predetermined angle and such that the first acoustic energy passes into an interior portion of the conduit and periodically reflects off a surface of the conduit and intersects the longitudinal axis of the conduit more than once prior to reception of the first acoustic energy at the second ultrasonic transducer.

53. The flow sensor of claim 52, wherein the means for directing first acoustic energy includes means for directing second acoustic energy from the second transducer to the first transducer such that the second acoustic energy impinges on an inner surface of the conduit at a second predetermined angle and such that the second acoustic energy passes into an interior portion of the conduit and periodically reflects off a surface of the conduit and intersects the longitudinal axis of the conduit more than once prior to reception of the second acoustic energy at the first ultrasonic transducer.

54. The flow sensor of claim 53, wherein the first predetermined angle is substantially equal to the second predetermined angle.

55. The flow sensor of claim 54, wherein the fluid is a semiconductor polishing slurry, and wherein the flow sensor further includes means for determining a flow rate of the fluid in the conduit.

56. The flow sensor of claim 55, wherein the first transducer is configured to generate longitudinal acoustic waves along a first path segment, and the second transducer is configured to generate longitudinal acoustic waves along a second path segment with the first path segment being substantially parallel to the second path segment.

57. The flow sensor of claim 56, wherein each of the first path segment and the second path segment is substantially parallel to the longitudinal axis of the conduit.

* * * * *